United States Patent
Yamamoto

(10) Patent No.: US 7,130,492 B2
(45) Date of Patent: Oct. 31, 2006

(54) IMAGE PROCESSING APPARATUS AND METHOD, AND PROGRAM

(75) Inventor: Kunihiro Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 10/238,847

(22) Filed: Sep. 11, 2002

(65) Prior Publication Data

US 2003/0053718 A1    Mar. 20, 2003

(30) Foreign Application Priority Data

Sep. 17, 2001 (JP) ............................. 2001-282100

(51) Int. Cl.
*G06K 9/60* (2006.01)
*G06K 9/34* (2006.01)
*G06K 9/46* (2006.01)

(52) U.S. Cl. ...................................... 382/305; 382/173

(58) Field of Classification Search ................ 382/305, 382/284, 217, 170, 164, 173, 190, 219, 220, 382/203; 707/4, 3, 104; 345/581
See application file for complete search history.

(56) References Cited

U.S. PATENT DOCUMENTS

| | | | |
|---|---|---|---|
| 6,181,818 B1 * | 1/2001 | Sato et al. ................. | 382/170 |
| 6,246,804 B1 * | 6/2001 | Sato et al. ................. | 382/284 |
| 6,400,853 B1 * | 6/2002 | Shiiyama .................... | 382/305 |
| 6,567,551 B1 * | 5/2003 | Shiiyama .................... | 382/217 |
| 6,584,223 B1 * | 6/2003 | Shiiyama .................... | 382/173 |
| 6,647,157 B1 * | 11/2003 | Shiiyama et al. ........... | 382/305 |
| 6,704,466 B1 * | 3/2004 | Yamamoto et al. ......... | 382/305 |
| 6,704,725 B1 * | 3/2004 | Lee ............................... | 707/4 |
| 6,720,971 B1 * | 4/2004 | Yamamoto et al. ......... | 345/581 |
| 6,724,946 B1 | 4/2004 | Kusama et al. ............. | 382/284 |
| 6,731,792 B1 * | 5/2004 | Tanaka ........................ | 382/164 |
| 6,731,826 B1 | 5/2004 | Yamamoto et al. ......... | 382/305 |
| 6,922,485 B1 * | 7/2005 | Hirata ......................... | 382/164 |
| 6,990,233 B1 * | 1/2006 | Park et al. ................... | 382/164 |

* cited by examiner

*Primary Examiner*—Matthew C. Bella
*Assistant Examiner*—Amir Alavi
(74) *Attorney, Agent, or Firm*—Fitzpatrick, Cella, Harper & Scinto

(57) ABSTRACT

A plurality of image data are stored in a hard disk drive in one-to-one correspondence with the image feature amounts of the image data. A CPU calculates the image feature amount of an input image on the basis of each color component value in a predetermined color space of each of regions obtained by segmenting the input image by a predetermined segmentation pattern. Image data similar to the input image is searched for on the basis of the calculated image feature amounts and the image feature amounts of the image data stored in the hard disk drive.

11 Claims, 16 Drawing Sheets

| (0, 0) | (1, 0) | (2, 0) | (3, 0) |
| --- | --- | --- | --- |
| (0, 1) | (1, 1) | (2, 1) | (3, 1) |
| (0, 2) | (1, 2) | (2, 2) | (3, 2) |
| (0, 3) | (1, 3) | (2, 3) | (3, 3) |

IMAGE PROCESSING APPARATUS AND METHOD, AND PROGRAM

FIELD OF THE INVENTION

The present invention relates to an image processing apparatus for searching for desired image data from a plurality of image data.

BACKGROUND OF THE INVENTION

Various search methods of searching for a desired image from a database storing a large amount of image data have been proposed. These search methods are roughly classified into:

- methods of relating non-image information such as a keyword or the date/time of photography to images, and searching for an image on the basis of the information; and
- methods of searching for an image on the basis of the image feature amount (e.g., luminance/color difference information, image frequency, or histogram) of that image.

In the latter methods, a method of searching for an image by presenting a certain image to a database and using the image feature amount of that image as a search condition is especially called similar image search. This method has the advantage that an intuitively readily understandable search interface can be provided to a user who has no particular knowledge about image processing.

Unfortunately, the conventional similar image search poses the following problems when calculating an image feature amount by segmenting an image into several regions and averaging pixel values contained in each region as the image feature amount of that image.

- If the number of segmented regions is large, the calculation is time-consuming, and no good search result can be obtained if the image position deviates.
- If the number of segmented regions is small, not enough image feature can be detected, so no good search result can be obtained.

SUMMARY OF THE INVENTION

The present invention has been made in consideration of the above situation, and has as its object to provide an image processing apparatus, method and a program capable of efficiently and accurately executing similar image search.

According to the present invention, the foregoing object is attained by providing an image processing apparatus for searching for desired image data from a plurality of image data from a plurality of image data. The apparatus comprises means for inputting an image as a search condition which is drawn in a user drawing area, and means for storing the plurality of image data in one-to-one correspondence with image feature amounts of the image data. Image feature amount calculating means are provided for calculating the image feature amount of an input image drawn in the user drawing area on the basis of each color component value in a predetermined color space of each of plural regions obtained by segmenting the input image by a predetermined segmentation pattern comprising the user drawing area. Also provided are similar image searching means, for searching for image data similar to the input image on the basis of the image feature amounts calculated by the image feature amount calculating means and the image feature amounts of the image data stored in the storage means. Additionally, the predetermined segmentation pattern is composed of the first segmented regions not containing the periphery of the input image, and the second segmented regions have different shapes from the first segmented regions.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail in accordance with the accompanying drawings.

<First Embodiment>

Figure 1:
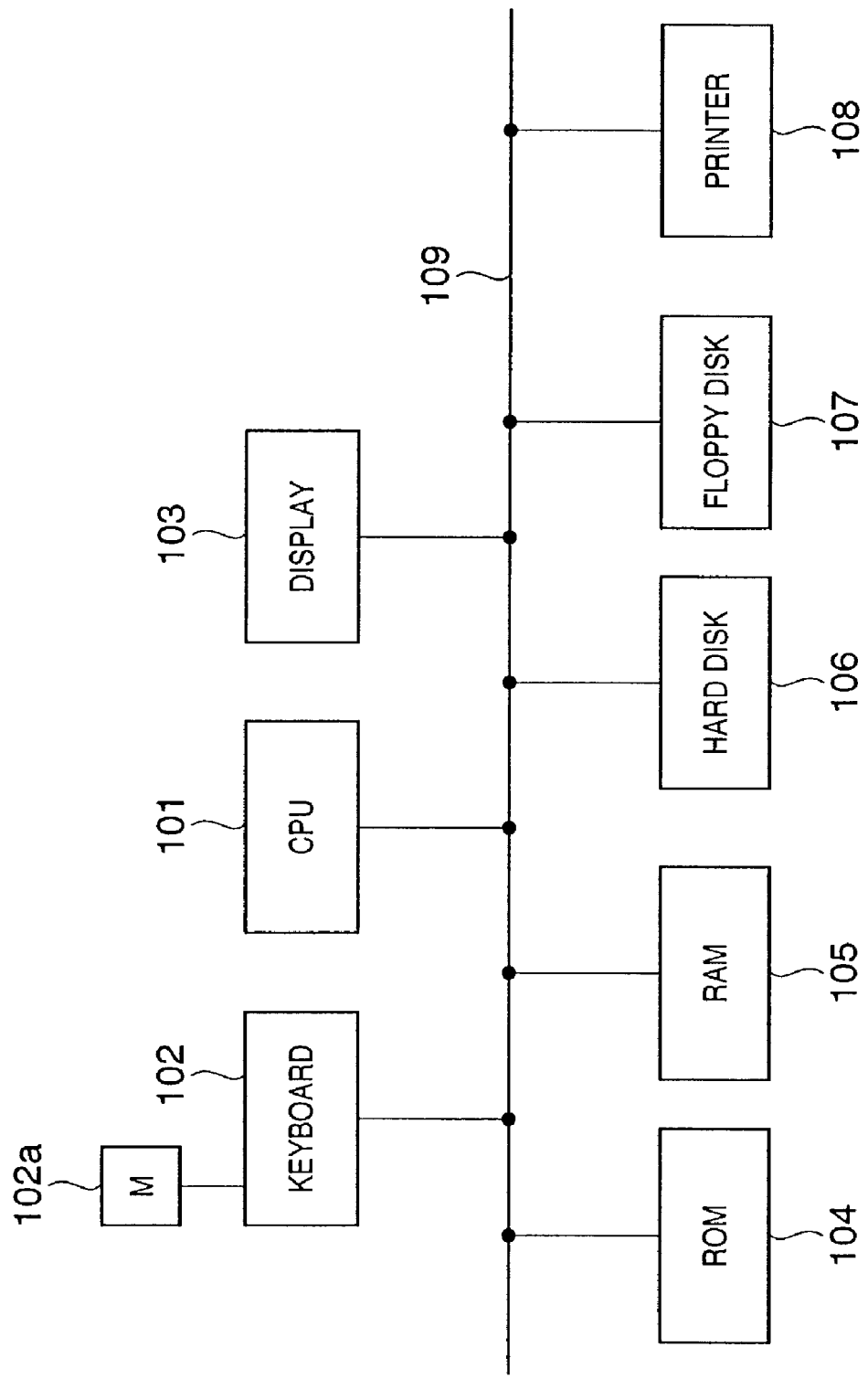
FIG. 1 is a block diagram showing the arrangement of an image processing apparatus according to the first embodiment of the present invention.

FIG. 1 is a block diagram showing the arrangement of an image processing apparatus according to the first embodiment of the present invention.

Referring to FIG. 1, a CPU 101 controls the whole image processing apparatus. A keyboard 102 and a mouse (M)

102a are used to input various data to the image processing apparatus. A display 103 is a CRT display or liquid crystal display, and displays a user interface for drawing an image as a search condition, image data as a search result, and the like.

A ROM 104 stores various programs for controlling the image processing apparatus, including programs for executing flow charts to be described later. A RAM 105 functions as a temporal saving area and work area of various data. A hard disk drive 106 stores various data including an image database for managing a plurality of image data as objects of search.

A floppy disk drive 107 performs data read and write to a floppy disk. A printer 108 prints on a printing medium an image or the like displayed on the display 103. A bus 109 connects these constituent elements.

The user interface displayed on the display 103 when a similar image search process is executed in the first embodiment will be explained with reference to FIG. 2.

Figure 2:
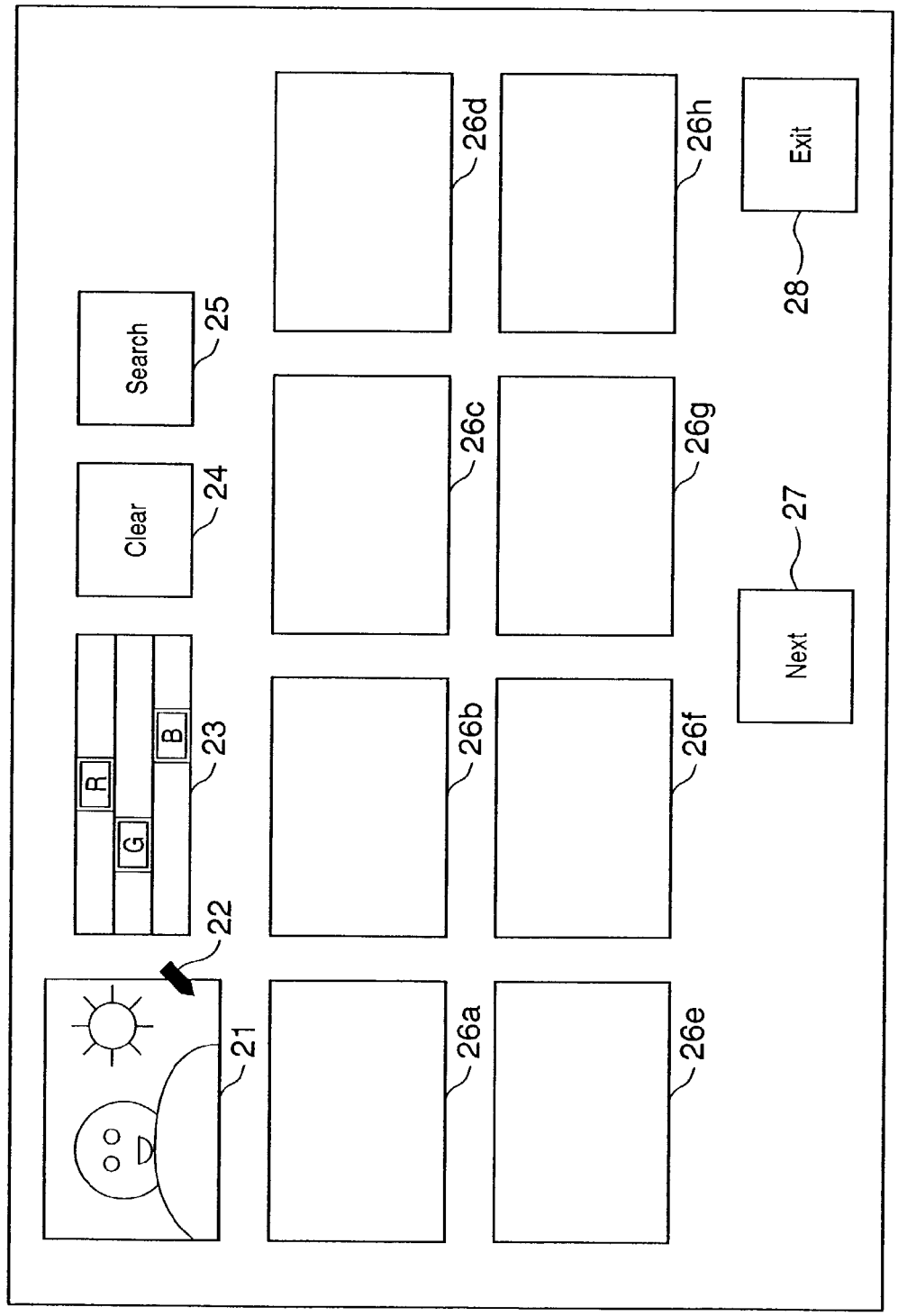
FIG. 2 is a view showing an operation window displayed on a display unit when a search process of the first embodiment of the present invention is executed.

FIG. 2 is a view showing an operation window displayed on the display 103 when the search process of the first embodiment of the present invention is executed.

Reference numeral 21 denotes a user drawing area; 22, a cursor which moves together with the movement of the mouse 102a; 23, color designating scroll bars; 24, a clear button; 25, a search execution (Search) button; 27, a next candidate display (Next) button; and 28, a process termination (Exit) button. Also, areas 26a to 26h display icon images corresponding to image data as search results.

A user can draw in the user drawing area 21 an image, as a search condition, which is made to imitate image data to be searched for, by using a drawing tool realized by software. An outline of the software operation when an image is drawn is as follows.

The color designating scroll bars 23 are used to designate the color of a pen for use in drawing, and designate R, G, and B values in this order from the upper bar. When the clear button 24 is clicked, the user drawing area 21 is entirely whitened. The user can freely draw curves in the user drawing area 21 by moving the cursor 22 by using the pointing device 102a. When the process termination button 28 is clicked, the operation window is closed, and the process is terminated.

An outline of the process executed in the first embodiment will be explained with reference to FIG. 3.

Figure 3:
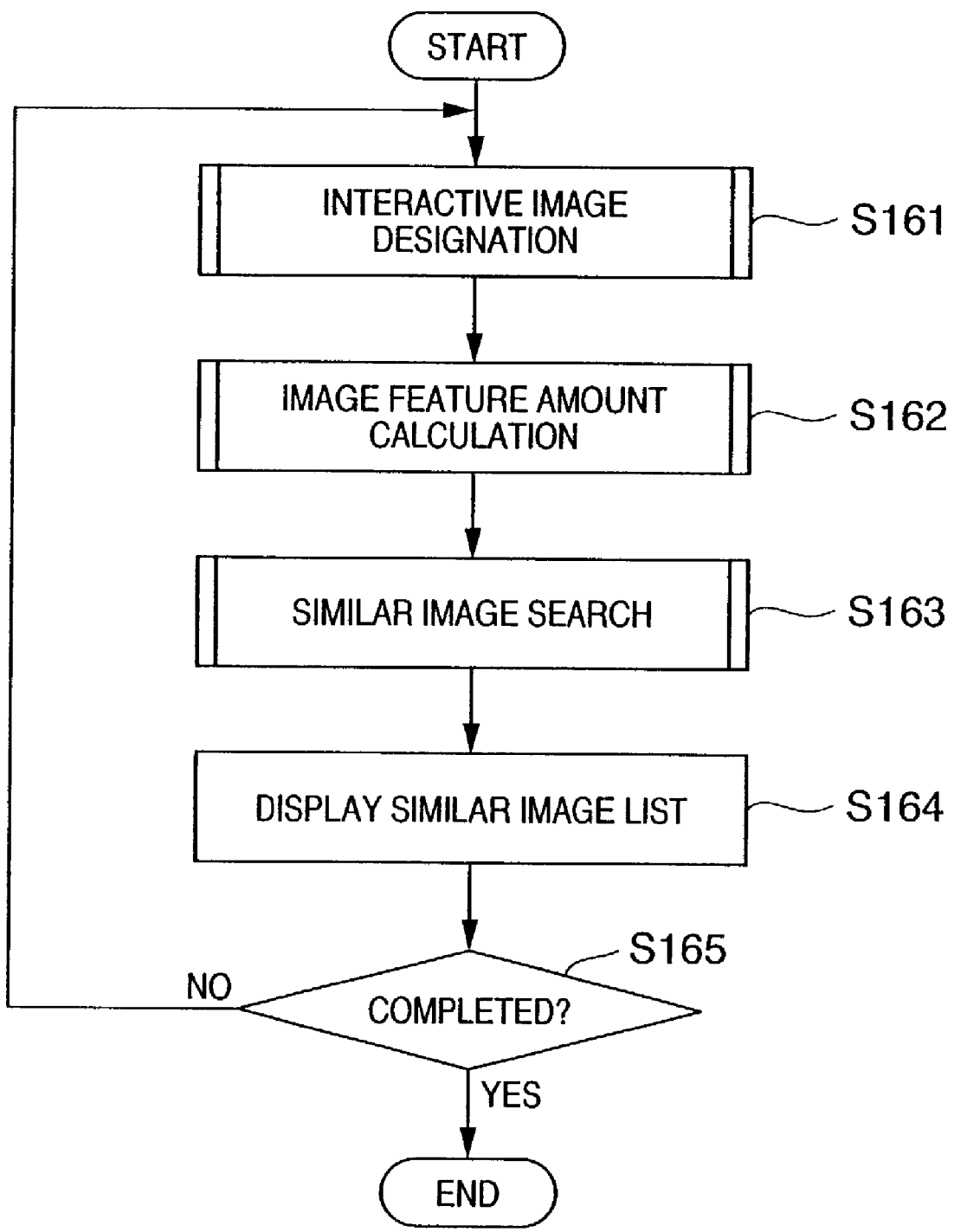
FIG. 3 is a flow chart showing an outline of the process of the first embodiment of the present invention.

FIG. 3 is a flow chart showing an outline of the process of the first embodiment of the present invention.

In step S161, an image as a search condition is drawn which is made to imitate desired image data to be searched for stored in the hard disk drive 106.

In step S162, the image feature amount of the drawn image is calculated. In step S163, similar image search is executed on the basis of the calculated image feature amount. In step S164, similar images found by the similar image search are displayed as a similar image list on the display 103.

In step S165, the presence/absence of designation of termination of the similar image search is checked. If there is no designation of termination (NO in step S165), the flow returns to step S161. If there is designation of termination (YES in step S165), the process is terminated.

Details of the processing in each step of FIG. 3 will be described below.

First, the processing in step S161 will be described in detail with reference to FIG. 4.

"Explanation of Step S161"

Figure 4:
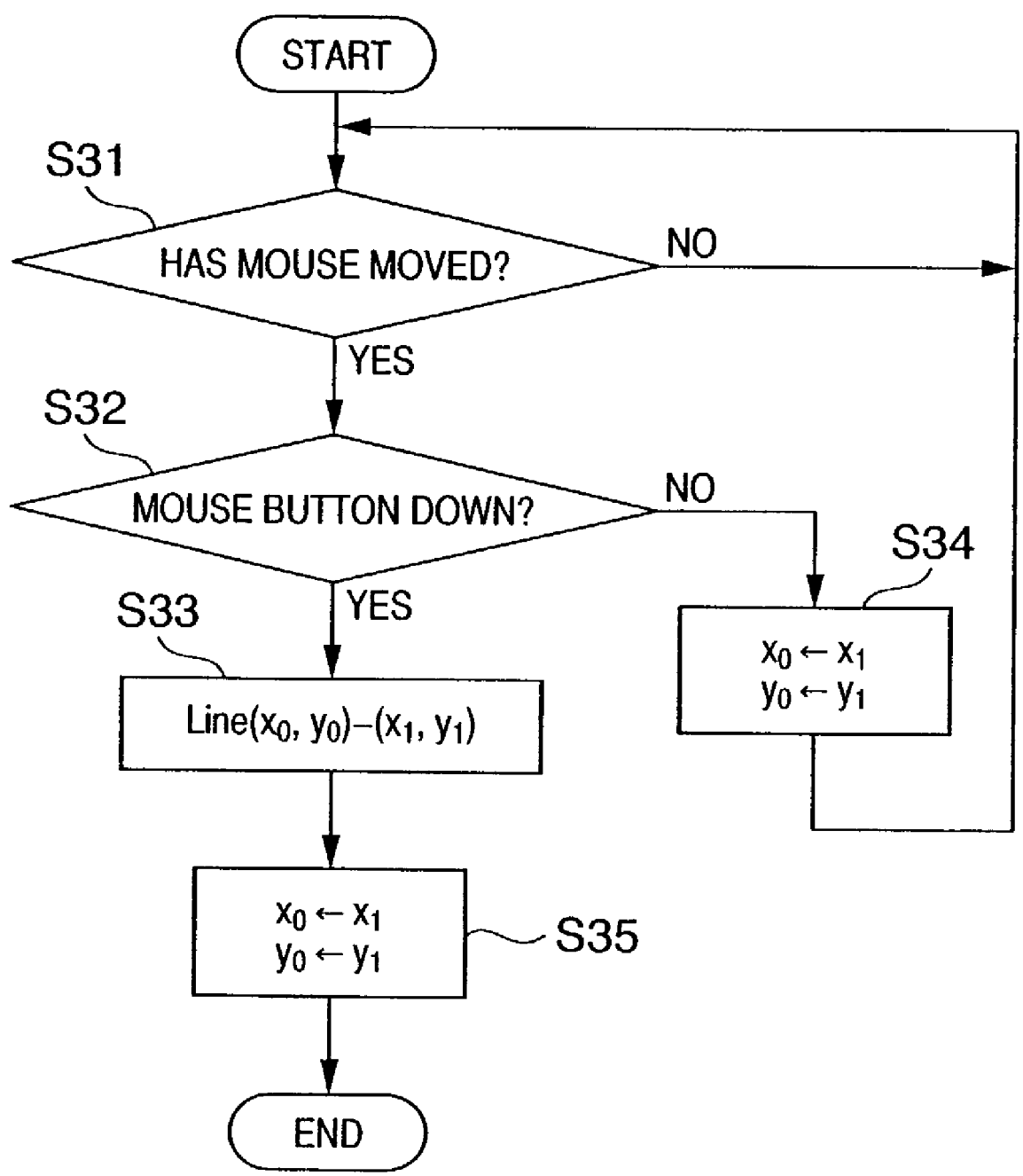
FIG. 4 is a flow chart showing details of processing in step S161 of the first embodiment of the present invention.

FIG. 4 is a flow chart showing details of the processing in step S161 of the first embodiment of the present invention.

In step S161, the user draws an image as a search condition in the drawing area 21, and the flow advances to step S162 at a proper timing. This processing will be explained with reference to FIG. 4. The proper timing is, e.g., a predetermined timing at which the system monitors the movement of the mouse 102a. Whenever this monitoring is performed, the image feature amount of the image drawn so far is calculated.

In the explanation of FIG. 4, x0 and y0 are variables storing the immediately preceding position of the cursor 22, and x1 and y1 are variables storing the present position of the cursor 22.

In step S31, whether the mouse 102a is moved by the user is checked. If the mouse 102a has not moved (NO in step S31), the flow returns to step S31. That is, this processing forms a loop for monitoring the movement of the mouse 102a. If the mouse 102a has moved (YES in step S31), the flow advances to step S32.

In step S32, whether the mouse button of the mouse 102a is pressed is checked. If the mouse button is not pressed (NO in step S32), the flow advances to step S34. In step S34, the present position (x1,y1) of the cursor 22 is substituted into (x0,y0), and the flow returns to step S31. In this way, the cursor 22 can be simply moved without drawing anything.

If the mouse button is pressed (YES in step S32), i.e., if drugging is being executed, the flow advances to step S33. In step S33, a line is drawn in a color determined by the color designating scroll bars 23 between the immediately preceding position (x0,y0) and present position (x1,y1) of the cursor 22.

In step S35, the present position (x1,y1) of the cursor 22 is substituted into (x0,y0), step S161 is terminated, and the flow advances to step S162.

This processing looks to the user that search is automatically executed whenever he or she adds some drawing (stroke) to the illustration.

The calculation of the image feature amount in step S162 will be explained next.

"Explanation of Step S162"

In step S162, the image feature amount of the image drawn in step S161 is calculated.

Figures 5A, 5B:
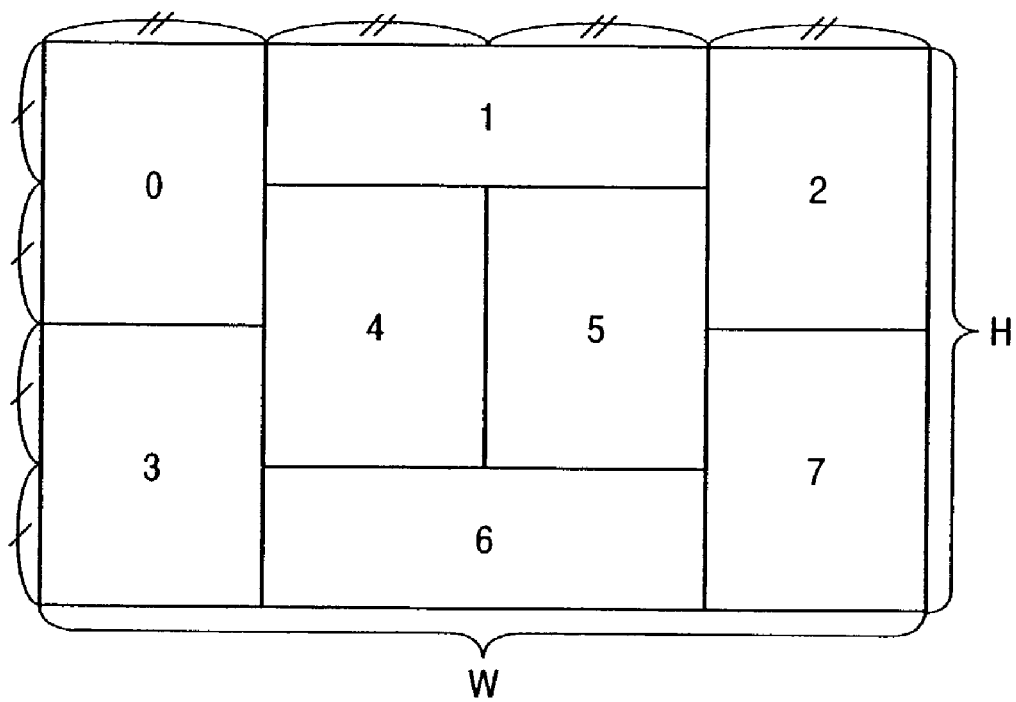
FIGS. 5A and 5B are views for explaining a segmentation pattern of the first embodiment of the present invention.

As shown in FIG. 5A, the user drawing area 21 has W pixels in the horizontal direction and H pixels in the vertical direction. This user drawing area 21 is segmented into eight regions having equal areas by a predetermined segmentation pattern. These regions are numbered 0, 1, . . . , 7 from the upper left one to the lower right one.

More specifically, as shown in FIG. 5B, the regions shown in FIG. 5A are obtained by equally segmenting the user drawing area 21 into four regions in each of the vertical and horizontal directions, i.e., into a total of 16 regions, and merging two adjacent regions. For example, region 4 in FIG. 5A is formed by merging a region (1,1) and region (1,2) in FIG. 5B. Likewise, regions 0, 2, 3, 4, 5, and 7 are formed by merging regions adjacent in the vertical direction, and regions 1 and 6 are formed by merging regions adjacent in the horizontal direction.

The average values of R, G, and B values in these eight regions 0 to 7 are calculated. A total of 24 numerical values thus calculated are used as the image feature amount of the image drawn in the user drawing area 21.

In the first embodiment, the image feature amount is calculated on the basis of the average values of color component values in a predetermined color space, i.e., the average values of R, G, and B values in the RGB color space. However, the present invention is not limited to this method. For example, the image feature amount can also be calculated on the basis of color component values in a given color space such as the YUV color space, HSV color space, or L*a*b* color space.

Figure 6:
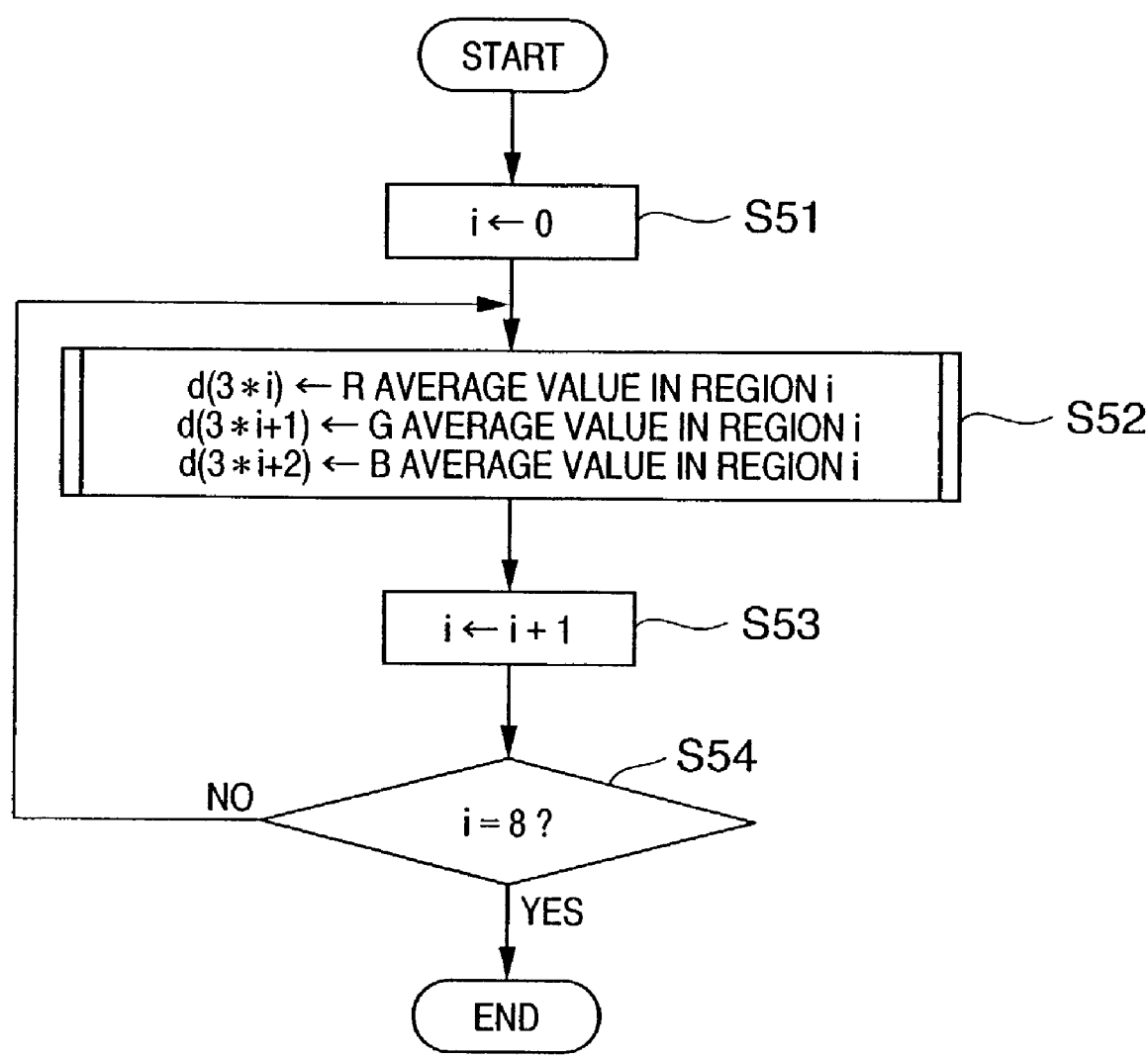
FIG. 6 is a flow chart showing details of processing in step S162 of the first embodiment of the present invention.

FIG. 6 is a flow chart showing details of the processing in step S162 of the first embodiment of the present invention.

First, in step S51, a variable i is initialized by 0. In step S52, the average value of R values in a region i is substituted into a (i*3)th element d (i*3) in an array d. Also, the average value of G values is substituted into d(i*3+1), and the average value of B values is substituted into d(i*3+2). Details of the method of calculating the average values of R, G, and B will be described later with reference to a flow chart in FIG. 7.

In step S53, the variable i is incremented by 1. In step S54, this variable i is compared with 8. If the variable i is 8 or less (NO in step S54), the flow returns to step S51. If the variable i is larger than 8 (YES in step S54), the processing is terminated.

When the above processing is completed, the image feature amount of the image drawn in the user drawing area 21 is stored in the array d( ) having 24 elements.

In this processing shown in FIG. 6, it is also possible to equally segment the user drawing area 21 into 16 regions as shown in FIG. 5B, and calculate an image feature amount which is an array d( ) having 48 elements. In this case, however, the number of segmented regions is large, so the processing amount increases. Also, when the number of segmented regions is large, even a slight positional deviation of the drawn image adversely affects the search result. Therefore, the number of segmented regions is appropriately 8. In addition, good search results can be obtained by segmenting the user drawing area 21 by the predetermined segmentation pattern as shown in FIG. 5A.

Furthermore, area segmentation can also be performed by an appropriate number of segmented regions, e.g., 2×3=6 or 3×3=9. In this case, the image feature amount is made up of 18 or 27 values, respectively. However, computers can most effectively use memories and computations when processing an image feature amount made up of the number of values which is a multiple of 8, e.g., 8, 16, 24, . . . . Hence, it is effective to calculate an image feature amount which is the array d( ) having 24 elements.

Also, to calculate the image feature amount, the image drawn in the user drawing area 21 is segmented into eight rectangular regions having equal areas. However, each segmented region need not be a rectangle but can have a more complicated shape, and the areas of these regions need not be equal. For example, if W or H is not a multiple of 4, the area cannot be equally segmented but can be segmented substantially equally by appropriate rounding. In addition, on the basis of the feature of the drawn image, it is possible to increase the areas of only central regions 4 and 5 or to dynamically change the areas.

The processing in step 52 of FIG. 6 will be explained in detail below with reference to FIG. 7.

Figure 7:
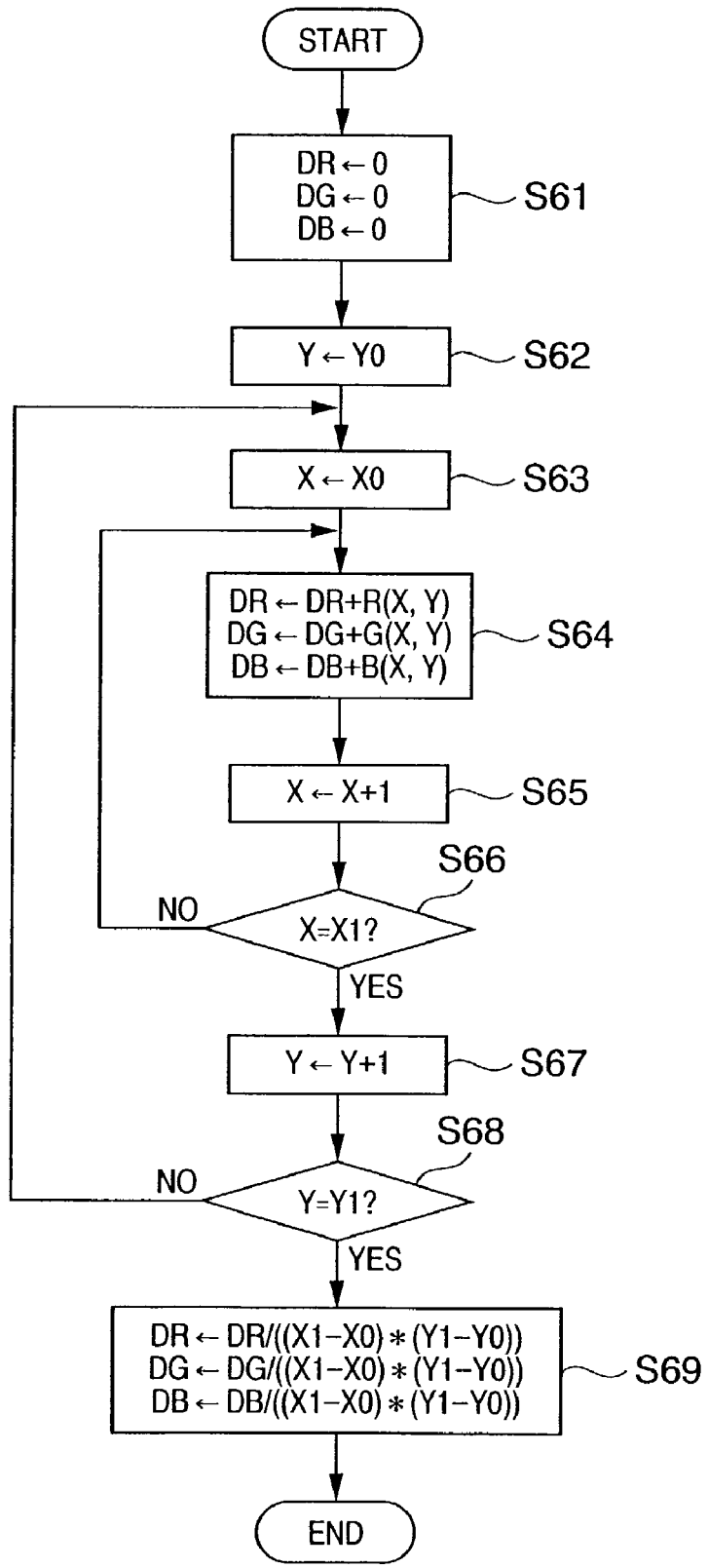
FIG. 7 is a flow chart showing details of processing in step S52 of the first embodiment of the present invention.

FIG. 7 is a flow chart showing details of the processing in step S52 of the first embodiment of the present invention.

Assume that image data of the image drawn in the user drawing area 21 is stored in three arrays R(X, Y), G(X, Y), and B(X, Y). Note that $0 \leq X < W$ and $0 \leq Y < H$, and that the upper left corner of the image is the origin (0, 0). In the following flow, the average values of R, G, and B values in a region where $X0 \leq X < X1$ and $Y0 \leq Y < Y1$ are calculated and returned to variables DR, DG, and DB, respectively. Furthermore, in step S162, a region equivalent to region 1 corresponds to

| X0 = W/4 | X1 = W*3/4 |
|---|---|
| Y0 = 0 | Y1 = H/4 |

Therefore, the flow chart is executed after constants X0, X1, Y0, and Y1 are initialized as described above. This similarly applies to other regions.

First, in step S61, the variables DR, DG, and DB are initialized by 0. In step S62, a variable Y is initialized by Y0. In step S63, a variable X is initialized by X0. In step S64, R(X, Y) is added to the variable DR. Likewise, G(X, Y) and B(X, Y) are added to the variables DG and DB, respectively.

In step S65, the variable X is incremented by 1. In step S66, this variable X is compared with X1. If the two values are equal (YES in step S66), the flow advances to step S67. If the two values are different (NO in step S66), the flow returns to step S64.

In step S67, the variable Y is incremented by 1. In step S68, this variable Y is compared with Y1. If the two values are equal (YES in step S68), the flow advances to step S69. If the two values are different (NO instep S68), the flow returns to step S64.

In step S69, the variables DR, DG, and DB are divided by (X1−X0)*(Y1−Y0). This is the number of pixels in the region. That is, the variables DR, DG, and DB are the average densities obtained by dividing the total sum of pixel densities in the region by the number of pixels.

"Explanation of Step S163"

Details of the processing in step S163 will be described with reference to FIGS. 8 and 9.

Assume that N image data are stored in the hard disk drive 106, and the image feature amount of each of these data is calculated and stored beforehand by the above processing. Image data can be stored in a standard file format such as well-known JPEG or FlashPix, or in a unique file format of so-called RDBMS (Relational DataBase Management System). Assume also that the image feature amount is stored in a two-dimensional array D(n, i)($0 \leq n < N$, $0 \leq i < 24$) having a size of N*24.

Under the conditions, an inter-image distance S(n) between the image (image data) drawn in the user drawing area 21 and the nth image data stored in the hard disk drive 106 is defined by $$S(n) = \Sigma (D(n, i) - d(i))^2$$

The smaller the inter-image distance S(n), the higher the similarity of the image data.

First, the inter-image distances S(n) ($0 \leq n < N$) between all the N image data stored in the hard disk drive 106 and the image (image data) drawn in the user drawing area 21 are calculated. Next, similar image search is performed by selecting M (0<M<N) image data in ascending order of the inter-image distance S(n). The former process of calculating the inter-image distances S(n) and the latter similar image search process of selecting the M image data will be explained below with reference to FIGS. 8 and 9, respectively.

Figure 8:
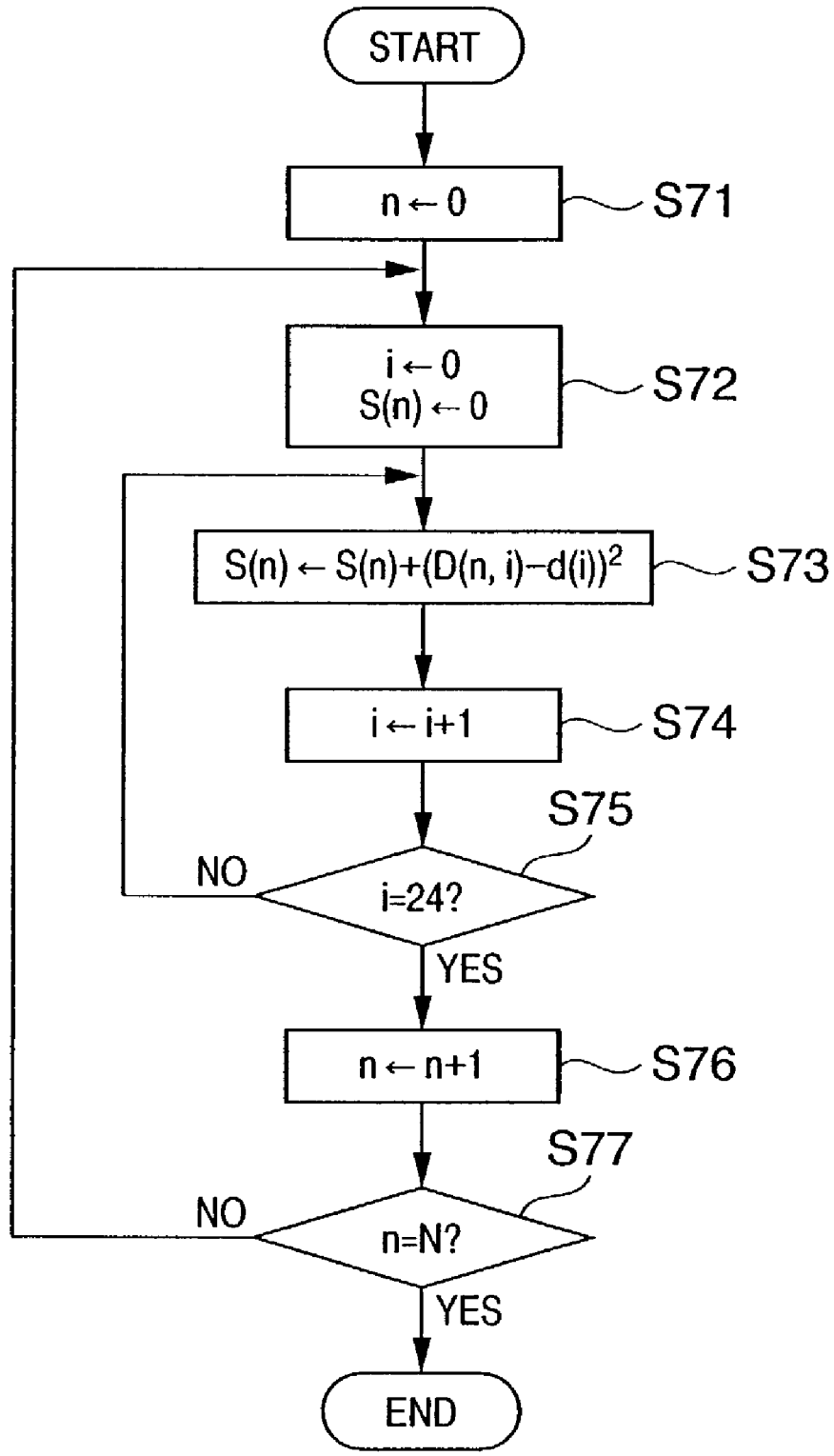
FIG. 8 is a flow chart showing the process of calculating an inter-image distance S(n) in the first embodiment of the present invention.

FIG. 8 is a flow chart showing the process of calculating the inter-image distances S(n) in the first embodiment of the present invention.

First, in step S71, a variable n is initialized by 0. In step S72, variables i and S(n) are initialized by 0. In step S73, the square of the difference between D(n,i) and d(i) is added to S(n). In step S74, the variable i is incremented by 1.

In step S75, this variable i is compared with 24. If the two values are equal (YES in step S75), the flow advances to step S76. If the two values are different (NO in step S75), the flow returns to step S73.

In step S76, the variable n is incremented by 1. In step S77, this variable n is compared with N. If the two values are different (NO in step S77), the flow returns to step S72. If the two values are equal (YES in step S77), the process is terminated.

When the above process is completed, the inter-image distances S(n) between the image (image data) drawn in the user drawing area 21 and all the image data stored in the hard disk drive 106 are stored in the array S(n). Details of the similar image search process in which the M image data are selected in ascending order of the inter-image distance S(n) and numbers corresponding to the order of the selected images are stored in an array T( ) will be described below with reference to FIG. 9.

Figure 9:
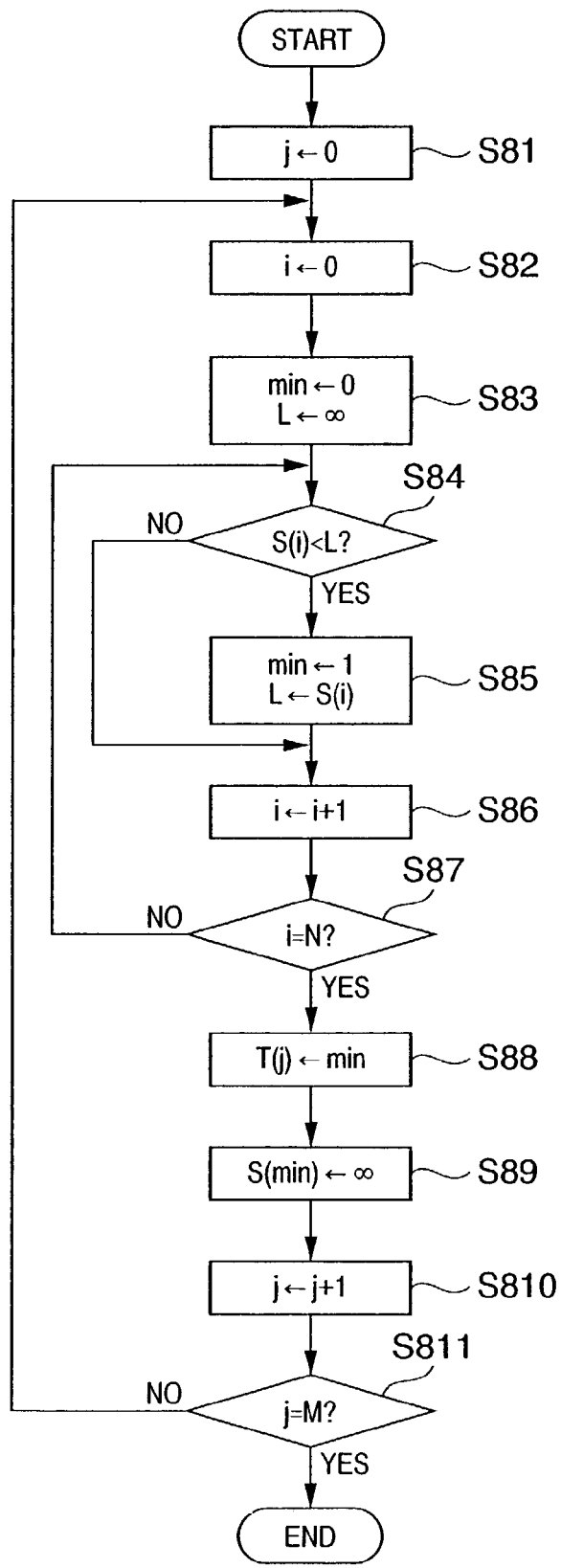
FIG. 9 is a flow chart showing details of the similar image search process of the first embodiment of the present invention.
Figure 10A:
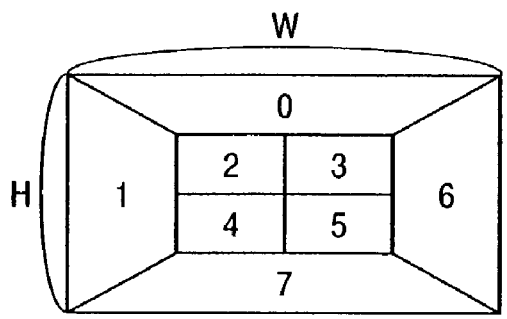
FIGS. 10A to 10H are views showing examples of segmentation patterns in the second embodiment of the present invention.
Figure 10B:
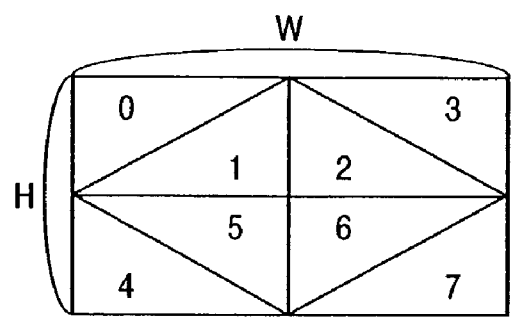
Figure 10C:
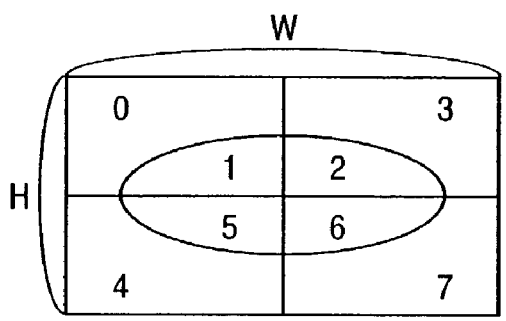
Figure 10D:
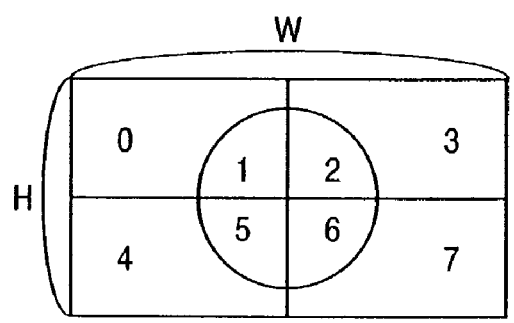
Figure 10E:
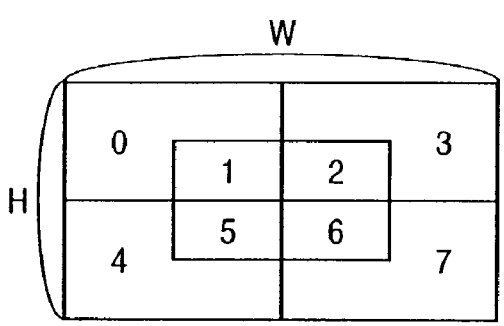
Figure 10F:
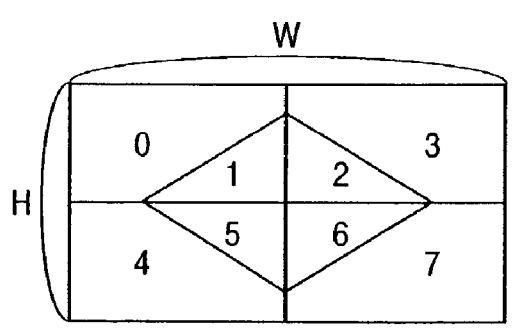
Figure 10G:
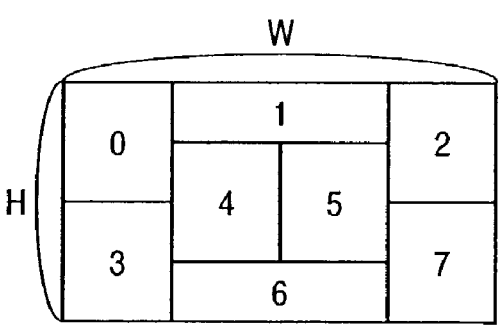
Figure 10H:
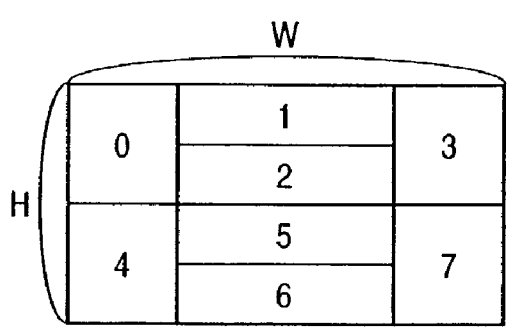

FIG. 9 is a flow chart showing details of this similar image search process of the first embodiment of the present invention.

First, in step S81, a variable j is initialized by 0. In step S82, a variable i is initialized by 0. In step S83, a variable min is initialized by 0, and L is initialized by a sufficiently large value. In step S84, S(i) and L are compared. If S(i) is less than L (YES in step S84), the flow advances to step S85. If S(i) is L or more (NO in step S84), the flow advances to step S86.

In step S85, the value i is substituted into the variable min, and S(i) is substituted into L. In step S86, the variable i is incremented by 1. In step S87, this variable i is compared with N. If the two values are equal (YES in step S87), the flow advances to step S88. If the two values are different (NO in step S87), the flow returns to step S84.

In step S88, the value min is substituted into T(j) In step S89, a sufficiently large value is substituted into S(min). In step S810, the variable j is incremented by 1. In step S811, this variable j is compared with M. If the two values are equal (YES in step S811), the process is terminated. If the two values are different (NO in step S811), the flow returns to step S82.

When the above process is completed, image numbers are stored in the array T(j) ($0 \leqq j < M$) in descending order of the image data similarity with respect to the image (image data) drawn in the user drawing area 21.

"Explanation of step S164"

The process contents will be described in accordance with the operation window shown in FIG. 2.

In areas 26a to 26h, icon images indicating, in a reduced scale, similar images found by the above processing are displayed. The area 26a displays an image corresponding to T(0) having the highest similarity, the area 26b displays an image corresponding to T(1), . . . , and the area 26h displays an image having the lowest similarity.

This reduced display can also be performed by decoding the image data stored in the hard disk drive 106 and displaying the decoded image data in a reduced scale on the screen. Also, if an image format has low-resolution icon data for icons as in the case of FlashPix as a standard image format, images can be displayed by using the icon data.

Each icon image can be "selected" by the cursor 22 by using the pointing device 102a. When the button 27 is clicked, the next candidates, i.e., icon images of image data corresponding to T(8) to T(15) are displayed in the areas 26a to 26h. This process can be repeated until T(M−1) is reached.

"Explanation of Step S165"

In step S165, whether the process termination button 28 is clicked is checked. If this button is clicked, the process is terminated. If this button is not clicked, the flow returns to step S161 to continue drawing of an image in the user drawing area 21.

In the first embodiment as described above, similar image search is performed on the basis of the image feature amount obtained for each region formed by segmenting the user drawing area 21 by the predetermined segmentation pattern as shown in FIG. 5A. This reduces the influence which the positional deviation of the image drawn in the user drawing area 21 has on the image feature amount calculation. Consequently, more efficient and accurate similar image search can be executed.

<Second Embodiment>

In the first embodiment, the user drawing area 21 is segmented into eight regions by the predetermined segmentation pattern as shown in FIG. 5A. However, the present invention is not restricted to this embodiment. For example, it is also possible to prepare a plurality of segmentation patterns corresponding to the features of images to be drawn in the user drawing area 21, and perform similar image search by using an optimum segmentation pattern.

FIGS. 10A to 10H show examples of these segmentation patterns.

These segmentation patterns are configured on the basis of the contents of images to be drawn in the user drawing area 21. These configurations are based on the tendency that users usually draw main images (objects) near the center of the user drawing area 21.

An image feature amount is calculated for all image data stored in a hard disk drive 106. This image feature amount calculation is done for all the image data on the basis of one segmentation pattern. This is so because no correct similar image search can be performed if different segmentation patterns are applied to an image drawn in the user drawing area 21 and image data stored in the hard disk drive 106, or if a first segmentation pattern is applied to certain image data while a second segmentation pattern is applied to another image data.

As a segmentation pattern for use in similar image search, therefore, a segmentation pattern is selected before this similar image search is executed, or an optimum segmentation pattern is selected when image data are stored in the hard disk drive 106. Alternatively, since the similar image search result changes in accordance with a selected segmentation pattern, a user can select an optimum segmentation pattern from a plurality of segmentation patterns when executing similar image search.

Note that when the segmentation patterns of the second embodiment are used, each region in each segmentation pattern is indicated by, e.g., T(x, y). In FIG. 5A of the first embodiment, therefore, the average density of each region in the segmentation pattern is calculated in accordance with variables X and Y to be substituted into T(x, y).

<Third Embodiment>

Figure 11A:
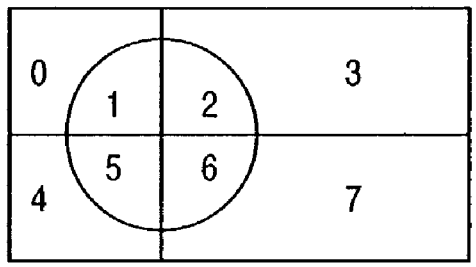
FIGS. 11A to 11F are views showing examples of segmentation patterns in the third embodiment of the present invention.
Figure 11B:
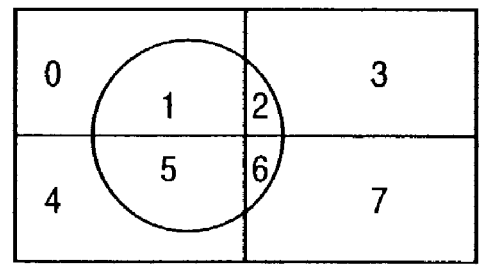
Figure 11C:
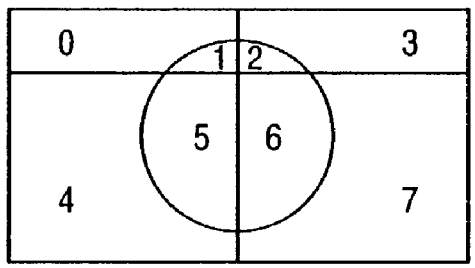
Figure 11D:
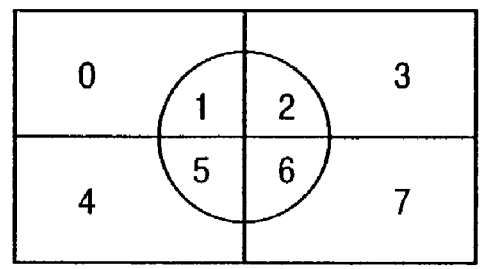
Figure 11E:
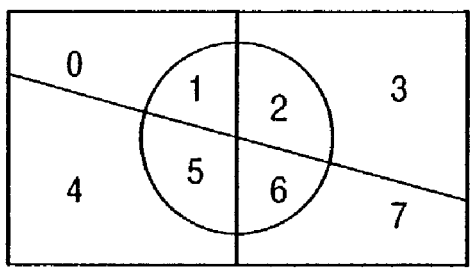
Figure 11F:
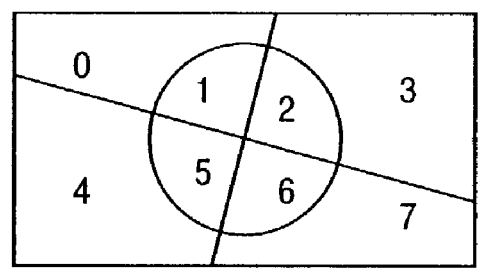

In the second embodiment, segmentation patterns symmetrical in both the vertical and horizontal directions are presented. However, the present invention is not limited to this embodiment. For example, segmentation patterns as shown in FIGS. 11A to 11F can also be used. FIGS. 11A to 11F are modifications of FIG. 10D of the second embodiment. As an example, FIG. 11A shows a segmentation pattern in which the center of a line for lateral segmentation is shifted. Also, FIG. 11B shows a segmentation pattern in which the center of the circle is shifted. Furthermore, FIG. 11D shows a segmentation pattern in which the radius of the circle is changed.

It is also possible to freely combine the segmentation patterns shown in FIGS. 11A to 11F.

Additionally, more appropriate similar image search can be performed by selecting a segmentation pattern capable of best expressing the differences between images, by collecting the statistics of the tendencies of image data stored in a hard disk drive 106 when image feature amounts are calculated.

The definitions of the features of the segmentation patterns for segmenting the user drawing area 21 explained in the first to third embodiments are as follows. That is, as shown in FIGS. 5A, 10A to 10H, and 11A to 11F, a predetermined segmentation pattern for segmenting an image is composed of a segmented regions not containing the periphery of the image and b segmented regions containing the periphery of the image, and a+b=8 holds.

<Fourth Embodiment>

Similar image search explained in the first to third embodiments is also applicable to the generation of a mosaic image which imitates an original image.

A mosaic image herein mentioned is formed by segmenting an original image into a plurality of segmented images, and incorporating material images (tile images) corresponding to these segmented images. This mosaic image is used when it is desirable to give special effects to an original image, e.g., used as a poster or catalogue image.

Figure 12:
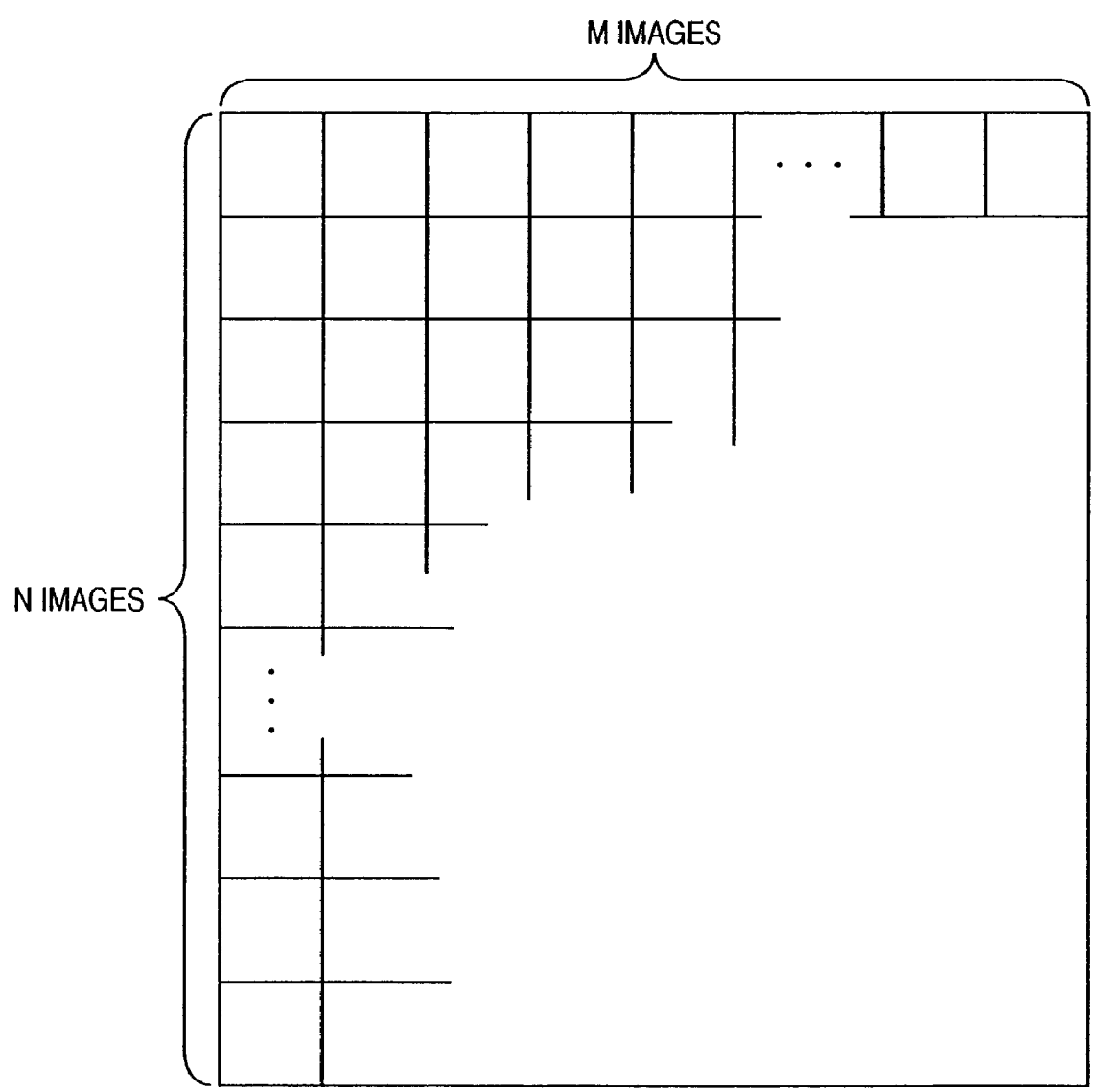
FIG. 12 is a view showing an example of segmentation of an original image in the fourth embodiment of the present invention.

In the fourth embodiment, therefore, to generate image data of this mosaic image, a hard disk drive 106 stores a plurality of (P) tile images as constituent elements of mosaic images. In accordance with a flow chart to be described later, M×N images selected from these tile images are combined such that, as shown in FIG. 12, M images are arranged in the horizontal direction and N images are arranged in the vertical direction, thereby forming a mosaic image. The mosaic image thus formed is stored as image data in the hard disk drive 106, displayed on a display 103, or output to and printed by a printer 108.

A practical example of the configuration of a mosaic image will be explained below with reference to FIG. 13.

Figure 13:
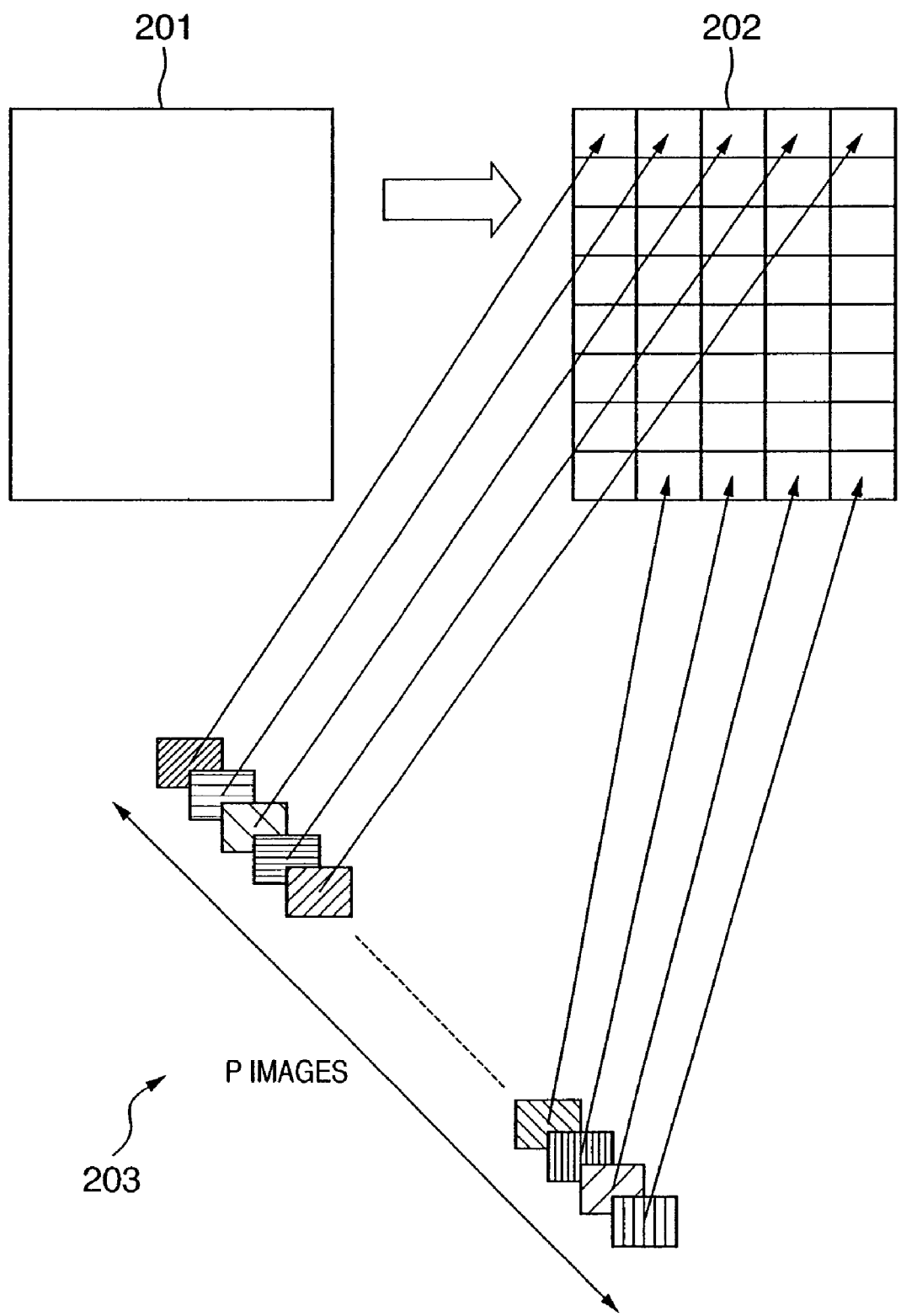
FIG. 13 is a view showing a practical example of the configuration of a mosaic image in the fourth embodiment of the present invention.

FIG. 13 is a view showing a practical example of the configuration of a mosaic image according to the fourth embodiment of the present invention.

Referring to FIG. 13, an image 201 is an original image to be reproduced as a mosaic image. An image 202 is a mosaic image constructed by a plurality of tile images. Material images (tile images) 203 are used to construct the image 202. The number P of these material images 203 is generally large enough to prepare colors and textures necessary to construct the image 202.

In this embodiment, each of the P material images 203 has the same size as a tile image for the sake of descriptive simplicity. However, the size of each material image 203 need not be the same as the size of a tile image. Also, not all of the material images 203 need to have the same size. When the material images 203 have different sizes, these material images 203 are used as tile images for constructing the image 202 after the sizes of these material images 203 are converted.

The number P is much larger than M×N described above.

An outline of processing executed in the fourth embodiment will be described below with reference to FIG. 14.

Figure 14:
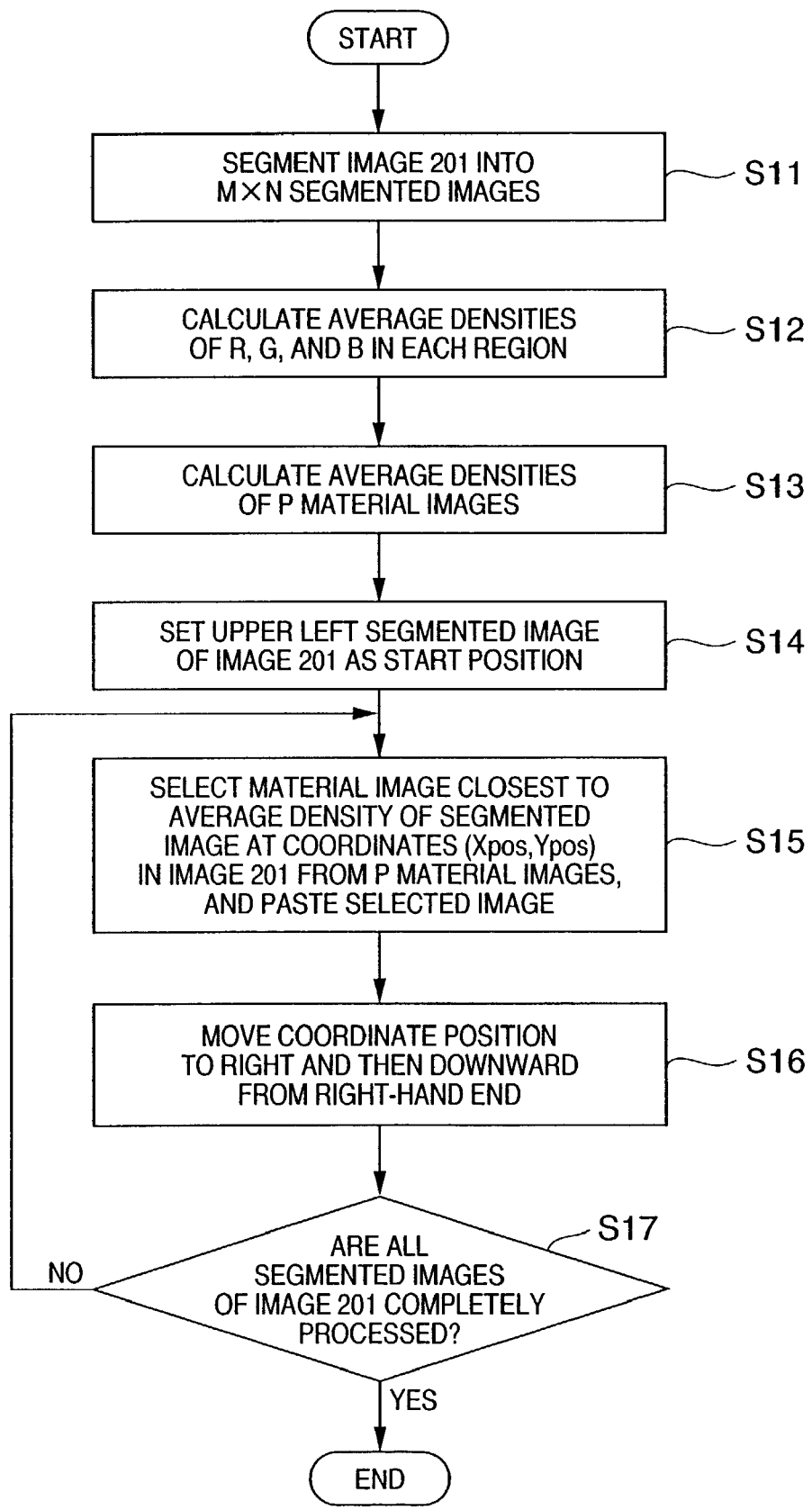
FIG. 14 is a flow chart showing an outline of processing executed in the fourth embodiment of the present invention.

FIG. 14 shows the process of generating a mosaic image by selecting appropriate material images.

Figure 15:
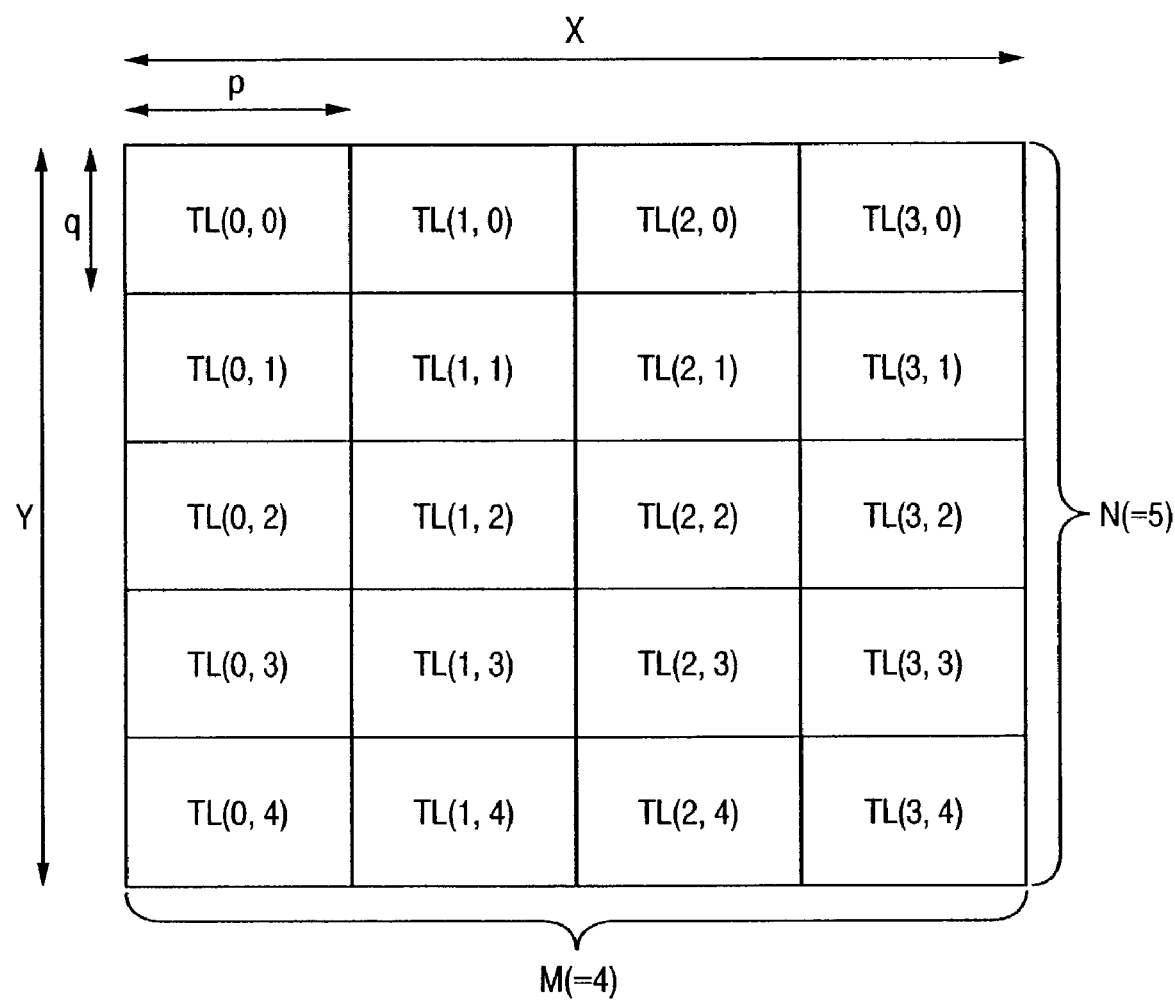
FIG. 15 is a view for explaining the definitions of the positions of segmented images of an original image in the fourth embodiment of the present invention.

First, in step S11, the image 201 is segmented into M×N segmented images. As a result of this segmentation, as shown in FIG. 15, the image 201 is divided into M×N segmented images TL(0, 0), TL(1, 0), TL(2, 0), . . . , TL(2, 4), and TL(3, 4). Referring to FIG. 15, reference symbols X and Y denote the numbers of pixels in the horizontal and vertical directions, respectively, in the image 201; and p and q, the numbers of pixels in the horizontal and vertical directions, respectively, in each segmented image.

Accordingly, X=p×M and Y=q×N hold.

Figure 16:
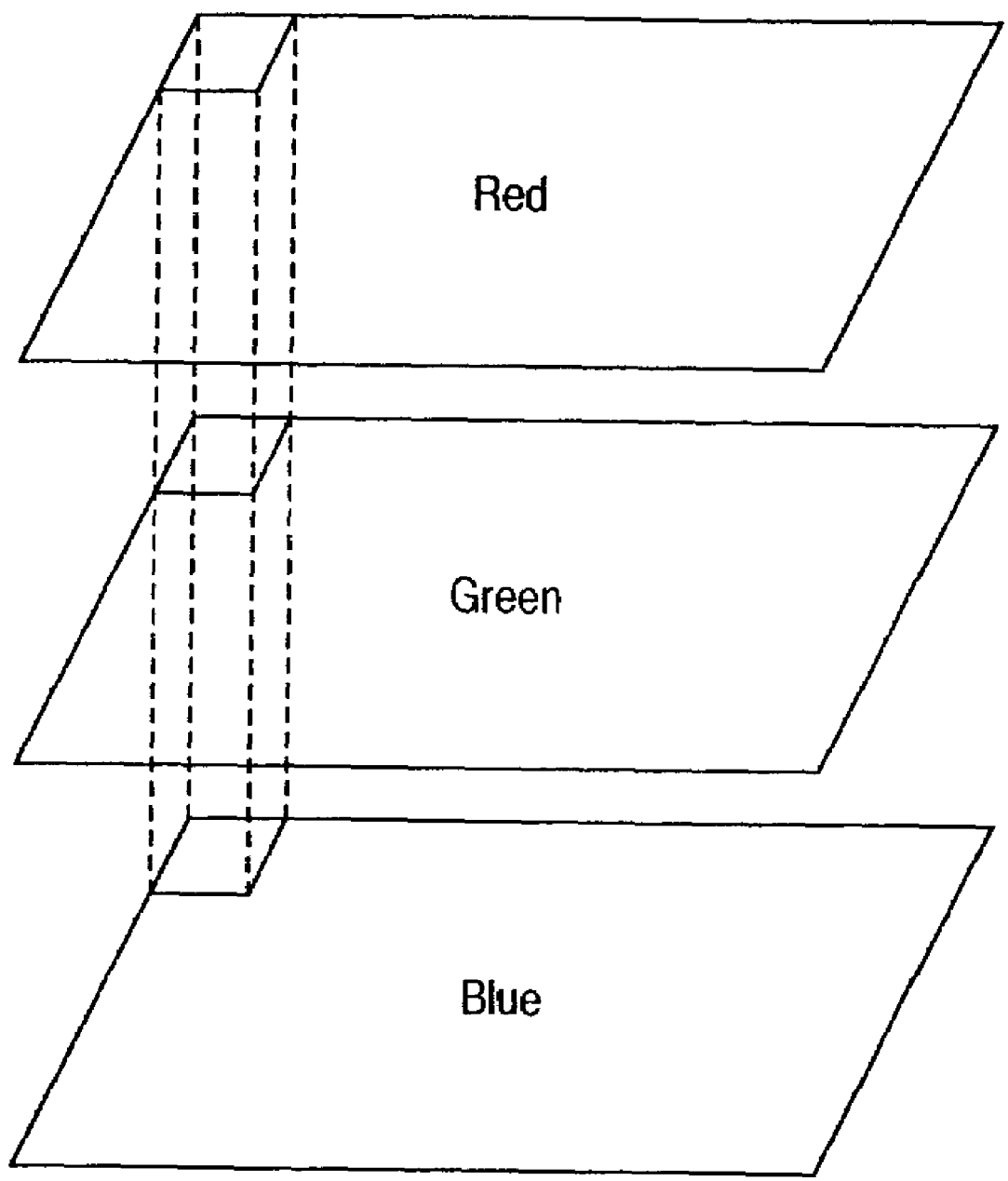
FIG. 16 is a view showing the configuration of a segmented image in the embodiments of the present invention.

To simplify the explanation, assume that all the segmented images have the same size. However, this is not always necessary. FIG. 16 shows the configuration of each segmented image. Each segmented image is decomposed into three primary colors, red (R), green (G), and blue (B), each consisting of p×q pixels.

In step S12, each of the M×N segmented images is further segmented into eight regions, and the average densities of R, G, and B in each region are calculated as the image feature amount of each segmented image.

Any of the first to third embodiments can be applied to the segmentation into segmented images and the calculation of the image feature amount of each segmented region, so a detailed description thereof will be omitted.

The calculated image feature amounts are stored in three arrays Rd-av(i), Gd-av (i), and Bd-av(i) (0≦i<8). In this case, "d-av" means the average value of destination-average (the original image 201).

In step S13, the average densities of R, G, and B in each of the eight segmented images of each of the P material images are calculated as the image feature amount of each region.

The calculated image feature amounts are stored in three arrays Rs-av(i), Gs-av(i), and Bs-av(i) (0≦i<8). In this case, "s-av" means the average value of a source (material image).

In step S14, both counters Xpos (0≦Xpos≦M−1) and Ypos (0≦Ypos≦N−1) indicating the position of a segmented image currently being processed are initialized to 0. (Xpos, Ypos)=(0, 0) indicates the upper left region of the image 201.

In step S15, a material image best suited to the segmented image indicated by the position counters Xpos and Ypos is selected from the P material images. In this selection method, for example, a distance ΔE between tristimulus values R, G, and B is calculated by the following equation, and an image having the smallest value is selected.

$$\Delta E = \Sigma((Rs\text{-}av(i) - Rd\text{-}av(i))^2 + (Gs\text{-}av(i) - Gd\text{-}av(i))^2 + (Bs\text{-}av(i) - Bd\text{-}av(i))^2)$$

On the basis of this equation, a material image having the smallest ΔE is selected from the P material images. The selected material image is read out from the hard disk drive 106, decoded, and pasted in the position of the corresponding segmented image.

In step S16, the position of processing is moved to the next segmented image to be processed.

In step S17, whether all the segmented images of the image 201 are completely processed is checked. If the process is not completed (NO in step S17), the flow returns to step S15. If the process is completed (YES in step S17), the process is terminated.

The present invention can be applied to a system constituted by a plurality of devices (e.g., a host computer, interface apparatus, reader, and printer) or to an apparatus (e.g., a copying machine or facsimile apparatus) comprising a single device.

Further, the object of the present invention can also be achieved by supplying a storage medium storing program codes of software for implementing the functions of the above embodiments to a system or apparatus, and reading out and executing the program codes stored in the storage medium by a computer (or a CPU or MPU) of the system or apparatus.

In this case, the program codes read out from the storage medium implement the functions of the present invention, and the storage medium storing these program codes constitutes the invention.

As this storage medium for supplying the program codes, it is possible to use, e.g., a floppy disk, hard disk, optical disk, magnetooptical disk, CD-ROM, CD-R/RW, DVD-ROM/RAM, magnetic tape, nonvolatile memory card, and ROM.

Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

When the present invention is applied to the storage medium described above, this storage medium stores the program codes corresponding to the flow charts explained previously.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for searching for desired image data from a plurality of image data, comprising:
    input means for inputting an image as a search condition which is drawn in a user drawing area;
    storage means for storing the plurality of image data in one-to-one correspondence with image feature amounts of the image data;
    image feature amount calculating means for calculating the image feature amount of an input image drawn in the user drawing area on the basis of each color component value in a predetermined color space of each of regions obtained by segmenting the input image by a predetermined segmentation pattern comprising the user drawing area; and
    similar image searching means for searching for image data similar to the input image on the basis of the image feature amounts calculated by said image feature amount calculating means and the image feature amounts of the image data stored in said storage means,
    wherein the predetermined segmentation pattern is composed of the first segmented regions not containing the periphery of the input image and the second segmented regions have different shapes from the first segmented regions.

2. The apparatus according to claim 1, wherein the predetermined segmentation pattern is composed of a segmented regions not containing the periphery of the input image and b segmented regions containing the periphery of the input image, and a+b=8 holds.

3. The apparatus according to claim 1, wherein
    said image feature amount calculating means comprises calculating means for calculating the average value of each color component value in the predetermined color space of each of the regions obtained by segmenting the input image by the predetermined segmentation pattern, and
    calculates the image feature amount of the input image on the basis of the average value of each color component value.

4. The apparatus according to claim 3, wherein
    the predetermined segmentation pattern includes a plurality of different segmentation patterns, and
    said calculating means calculates the average value of each color component value in the predetermined color space of each of the regions obtained by segmenting the input image by one segmentation pattern selected from the plurality of different segmentation patterns.

5. The apparatus according to claim 1, wherein the predetermined color space is one of the RGB color space, YUV color space, HSV color space, and L*a*b* color space.

6. An image processing method of searching for desired image data from a plurality of image data, comprising:
    an image feature amount calculation step of calculating the image feature amount of an input image drawn in a user drawing area on the basis of each color component value in a predetermined color space of each of regions obtained by segmenting the input image by a predetermined segmentation pattern comprising the user drawing area; and
    a similar image search step of searching for image data similar to the input image on the basis of the image feature amounts calculated in the image feature amount calculation step and the image feature amounts of image data stored in a storage medium,
    wherein the predetermined segmentation pattern is composed of the first segmented regions not containing the periphery of the input image and the second segmented regions have different shapes from the first segmented regions.

7. The method according to claim 6, wherein the predetermined segmentation pattern is composed of a segmented regions not containing the periphery of the input image and b segmented regions containing the periphery of the input image, and a+b=8 holds.

8. The method according to claim 6, wherein
    the image feature amount calculation step comprises the calculation step of calculating the average value of each color component value in the predetermined color space of each of the regions obtained by segmenting the input image by the predetermined segmentation pattern, and in the image feature amount calculation step, the image feature amount of the input image is calculated on the basis of the average value of each color component value.

9. The method according to claim 8, wherein
the predetermined segmentation pattern includes a plurality of different segmentation patterns, and
in the calculation step, the average value of each color component value in the predetermined color space of each of the regions obtained by segmenting the input image by one segmentation pattern selected from the plurality of different segmentation patterns is calculated.

10. The method according to claim 6, wherein the predetermined color space is one of the RGB color space, YUV color space, HSV color space, and L*a*b* color space.

11. A program, stored in executable form in a computer-readable storage medium, for allowing a computer to execute image processing of searching for desired image data from a plurality of image data, comprising:

a program code of an image feature amount calculation step of calculating the image feature amount of an input image drawn in a user drawing area on the basis of each color component value in a predetermined color space of each of regions obtained by segmenting the input image by a predetermined segmentation pattern comprising the user drawing area; and a program code of a similar image search step of searching for image data similar to the input image on the basis of the image feature amounts calculated in the image feature amount calculation step and the image feature amounts of image data stored in a storage medium, wherein the predetermined segmentation pattern is composed of the first segmented regions not containing the periphery of the input image and the second segmented regions have different shapes from the first segmented regions.

* * * * *